United States Patent Office 2,876,409
Patented Mar. 3, 1959

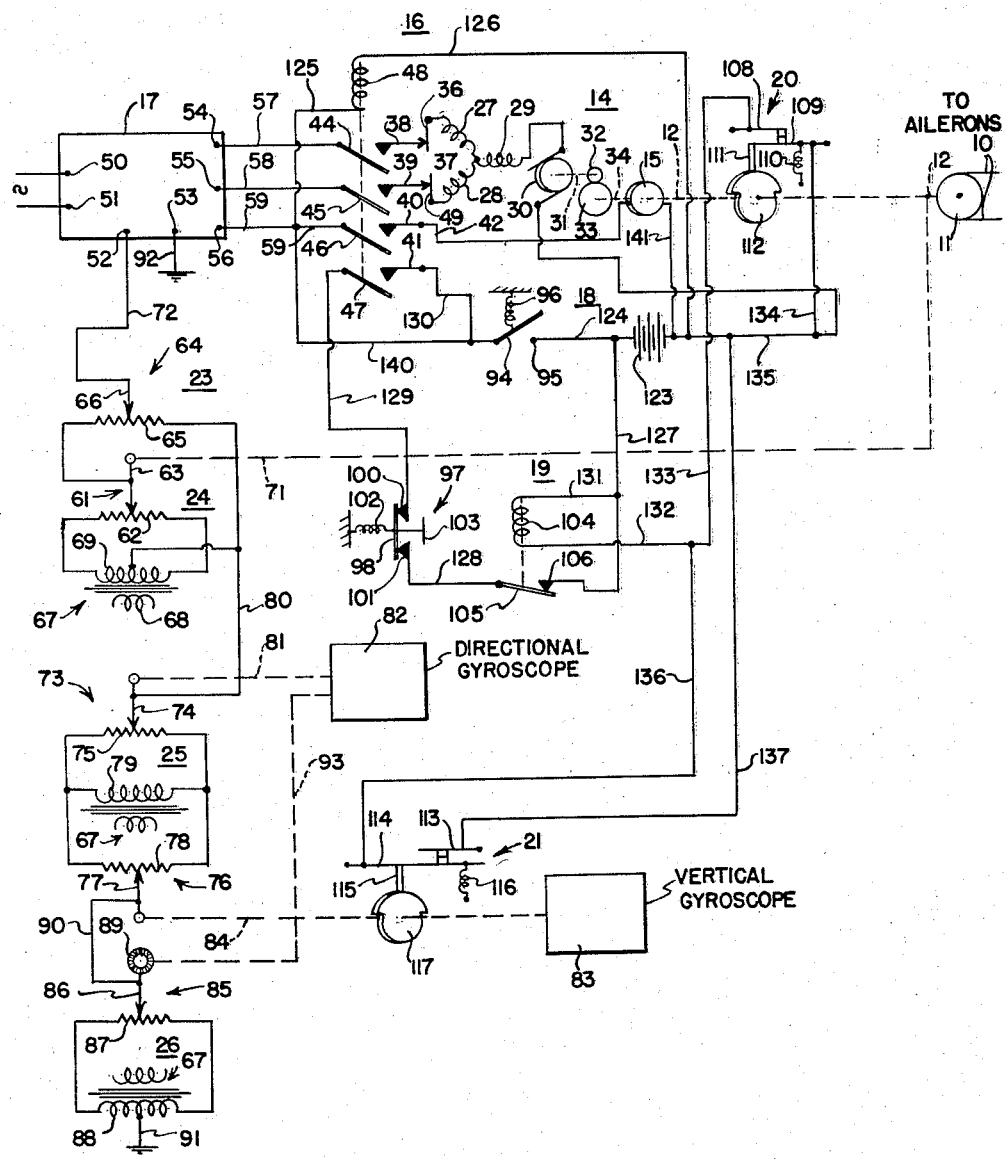

2,876,409

STEERING MECHANISMS FOR AIRCRAFT

Joseph W. Skovholt, St. Paul, and Clarence E. Vogel, Minneapolis, Minn., assignors to Minneapolis-Honeywell Regulator Company, Minneapolis, Minn., a corporation of Delaware Application May 31, 1952, Serial No. 290,968

10 Claims. (Cl. 318—489)

This invention pertains to steering apparatus for controlling the flight of aircraft and is concerned with such type of apparatus in which the aileron control surfaces of such aircraft may be controlled automatically, for instance by a heading responsive device, in order to maintain the craft on a predetermined heading. Such apparatus includes a manually operable turn control device for effecting changes in heading of the craft through the steering apparatus at which time the heading responsive device is rendered ineffective with respect to the steering apparatus.

In some prior arrangements, operation of the ailerons has been initiated by the heading responsive device or by the manual turn control device, and a servomotor which has been thereby set into operation limits the movement of the ailerons in proportion to the movement of the heading responsive device or the manual turn control device. As the aircraft has banked due to the applied ailerons, a vertical gyroscope responsive to the attitude of the craft about its longitudinal axis has caused reverse operation of the servomotor for positioning the ailerons so that the bank attitude is proportional to the operation of the heading responsive device or the manual turn control device. Thus it is evident that the heading change initiating device has its effect opposed by joint action of the servomotor movement and the vertical gyroscope responsive to bank attitudes.

In the prior devices, the servomotor when it has exceeded a predetermined movement has operated a limit switch which has prevented further movement of the servomotor to displace the ailerons from a normal position. In some cases, alternatively, the servomotor when it has exceeded a predetermined movement in displacing the aileron control surfaces from a normal position, an indication generally of a malfunction of the apparatus, effects the disengagement of the automatic steering mechanism from the aileron control surfaces of the aircraft. When the system provides for disengagement of the automatic steering mechanism from the control surfaces when the servo movement exceeds a predetermined amount, it permits the pilot manually to operate the control surfaces to return them to normal. While this arrangement is generally acceptable since it prevents large control surface displacement and thus large turning moments tending to overstress the craft structure it has been found undesirable in some forms of aircraft.

In some types of aircraft, such as large bomber type aircraft, the rate of roll of such craft about the longitudinal axis, in response to aileron displacement is not very high. Consequently, when the heading responsive device or the manual turn control device has provided an initiating signal which would ordinarily be balanced by the sum of the movement of the servomotor driving the control surface and also the movement of the vertical gyro in response to bank of the aircraft, that due to the slow rate of roll of the aircraft, the servomotor movement would attempt to balance the initiating signal by itself. In such case, the servomotor has moved to its extremity of movement permitted in attempting to balance the initiating signal, with the result that the automatic steering mechanism has been disengaged from the aileron control surfaces which result is not desired under these circumstances.

It is an object therefore of this invention to provide a novel monitoring arrangement which provides for the disengagement of an automatic steering mechanism from the control surfaces of an aircraft.

It is a further object of this invention to provide an arrangement for disengaging an automatic steering mechanism from the control surfaces of an aircraft when the movement of the servomotor for operating the control surfaces of such craft and the attitude of the aircraft about an axis controlled by said surfaces exceed a predetermined limit.

It is an object of this invention to disengage the automatic steering mechanism for an aircraft from the control surfaces thereof when movement of such control surfaces and the attitude of the craft about an axis controlled by such surfaces simultaneously exceeds a predetermined limit.

It is a further object of this invention to provide an arrangement for disengaging an automatic steering mechanism from the control surfaces of an aircraft in which said steering mechanism includes servomotor for operating control surfaces of the aircraft to control the heading thereof and in which said steering motors are operated in accordance with a heading control device whose operation is opposed by the extent of movement of the servomotor and the attitude of the aircraft about the axis controlled by said surfaces and in which the steering mechanism is disengaged from said control surfaces upon the simultaneous operation of the servomotor and the operation of the device responsive to attitude of the craft about the axis controlled by said surfaces exceeding a predetermined limit.

The above and further objects of the invention will hereinafter be apparent upon consideration of the following detailed description taken in connection with the accompanying drawing illustrating a preferred embodiment thereof.

The sole figure in the drawing is a diagrammatic representation of the apparatus.

Referring to the drawing, the ailerons (not shown) are operated from the steering mechanism by control cables 10 extending from a cable drum 11 carried by an output shaft 12 of a servomotor 14. Operative engagement between the servomotor 14 and the output shaft 12 is effected by a suitable magnetic clutch 15 which thus serves to engage the servomotor with the aileron control surfaces. The servomotor 14 by means of an engage relay 16 is reversibly controlled by an aileron servomotor amplifier 17 which relay also controls the energization of clutch 15. The energization of relay 16 is effected by a momentarily actuated switch 18 and a holding circuit through one set of relay contacts. This holding circuit includes contacts of a second relay 19 the energization of which depends upon the simultaneous closing of a switch 20 dependent upon the extent of servomotor rotation and a switch 21 dependent upon the bank attitude of the aircraft. Thus the simultaneous opening of switches 20 and 21 will result in the amplifier controlling no further servomotor 14 and the disengagement of the servomotor from the output shaft 12 and thus the disengagement of the servomotor from the aileron control surfaces.

While movement of the control surfaces from motor 14 is thus limited by the engage circuit being rendered ineffective, the operation of the aileron control surface is also limited by conventional servo operated limit switches 36, 49. Switch 36 limits servo movement in one direction and switch 49 in the other. They prevent injury of the aircraft from the operated control surface if such operation attempts to exceed a predetermined amount. As to limit switches 36, 49, the servomotor and control surfaces remain engaged to permit reverse operation of the control surface if one limit switch has been operated.

The amplifier 17 reversibly operates the servo motor 14 in accordance with the direction of unbalance of a balanceable network 23. The network 23 includes a control surface position voltage signal generator 24; a heading—craft bank attitude voltage signal generator 25; and a manual heading voltage signal generator 26.

Returning to the servomotor 14, this motor is a reversible D. C. series motor having field windings 27, 28, a pulsing clutch winding 29, and armature 30. The servomotor includes a drive shaft 31 driven from armature 30 which through reduction gearing 32, 33 drives the output shaft 34 of the servomotor. Shaft 34 is operatively coupled to output shaft 12 through the aforementioned magnetic clutch 15. The pulsing clutch winding 29 and armature 30 are connected in series and thence in series with motor windings 27 and 28. The pulsing clutch 29 is of the type wherein shaft 31 is held against rotation in a braked position during deenergization periods of the winding 29 but upon energization thereof shaft 31 is released from its brake and is drivably connected to armature 30. Such an arrangement is well known in the art and further description thereof is omitted since the details thereof form no essential part of the present invention.

Extending from the free end of motor winding 27 through limit switch 36 to an in contact 38 of engage relay 16 is one motor energizing connection. Extending from the free end of motor winding 28 through limit switch 49 to an in contact 39 of relay 16 is another alternative and reversely effective motor energizing connection. A conductor 42 extends from the magnetic clutch 15 to an in contact 40 of relay 16. The relay additionally includes a holding circuit contact 41. Coacting with contacts 38, 39, 40 and 41 are relay arms 44, 45, 46 and 47 respectively. The engage relay 16 includes an operating winding 48.

Amplifier 17 is of the A. C. discriminator type having power input terminals 50, 51 connectable to a source of alternating voltage; signal input terminals 52, 53 connectable with alternating voltage signal network 23; a D. C. power input terminal 56, and D. C. power output terminals 54, 55. The amplifier includes a pair of relays (not shown) which are alternatively operated depending upon the phase relationship of the source voltage across power input terminals 50, 51 with respect to the voltage across signal input terminals 52, 53. The relays when thus operated effect application of the D. C. voltage at terminal 56 to output terminals 54 or 55. The amplifier may be of the type disclosed in Patent No. 2,425,734 to Willis H. Gille et al. dated August 19, 1947. Conductors 57 and 58, respectively connect terminals 54, 55 to relay arms 44, 45. Conductors 59, 140, 124 connect terminal 56 to a D. C. source 123.

Continuing to the network 23, the source of control signals, signal generator 24 comprises a follow-up potentiometer 61, an aileron ratio potentiometer 64, and a transformer 67. Potentiometer 61 comprises a resistor 62 and slider 63 with the resistor connected across the ends of a secondary winding 69 of transformer 67. Transformer 67 includes a primary winding 68. Since a single primary winding may energize a plurality of secondary windings, in the signal generators to be described the additional secondary windings will be indicated as forming part of transformer 67. Potentiometer 64 includes a resistor 65 and slider 66. The resistor 65 is connected across slider 63 and a center tap of secondary winding 69. Slider 63 is positioned along resistor 62 in accordance with the movement of the output shaft 12 of servomotor 14 by suitable operating means 71. Slider 66 is manually adjusted along resistor 65 to select any desired ratio of the voltage generated by the positioning of slider 63 from its normal position at the center of resistor 62. A conductor 72 extends from amplifier terminal 52 to slider 66.

Signal generator 25 comprises a heading stabilizing potentiometer 73, a bank attitude potentiometer 76, and a secondary winding 79 of transformer 67. Potentiometer 73 includes a slider 74 and a resistor 75 which is connected across secondary winding 79. Slider 74 is positioned along resistor 75 from the electrical center thereof in either direction in accordance with changes in heading of the aircraft. This positioning of slider 74 is provided from a directional gyroscope 82 through a suitable operating connection 81.

The directional gyroscope is of the conventional type whose rotor has three axes of freedom and which positions slider 74 with respect to resistor 75 in accordance with the magnitude of change in heading of the craft during stabilized heading control.

Slider 77 is positioned along resistor 78 from the electrical center thereof in either direction in accordance with the bank attitude of the aircraft. This positioning of slider 77 is effected by a vertical gyroscope 83 through a suitable operating means 84. The vertical gyroscope 83 is of the type well known in the art whose rotor has three axes of freedom. The gyroscope is provided with suitable erecting means to maintain the spin axis of the rotor in a vertical position relative to the earth. The rotor also has angular freedom of movement about two respectively perpendicular but horizontal axes. A conductor 80 connects slider 74 to the center tap of secondary winding 69.

Signal generator 26 comprises a manually operable turn control potentiometer 85 having a slider 86 and resistor 87 with the resistor connected across a secondary winding 88 of transformer 67. Slider 86 is positioned along resistor 87 by a suitable operating knob 89 manually controlled. A conductor 90 connects slider 86 to slider 77 of generator 25. A conductor 91 extends from a center tap of secondary winding 88 to ground which is common with ground conductor 92 of amplifier 17. Conventionally associated with the turn control knob 89 is an arrangement 93 for rendering the directional gyroscope 82 ineffective to position slider 74 during manual changes of heading resulting from the displacement of slider 86 in the turn control signal generator 26.

A circuit for initiating energization of coil 48 of engage relay 16 is controlled by the manually operable switch 18. Switch 18 is of the momentarily closed type and consists of an arm 94, a momentarily engageable contact 95 and spring means 96 connected between arm 94 and the fixed part of the switch. Upon release of arm 94, spring 96 moves arm 94 away from contact 95.

A holding circuit for energizing relay winding 48 includes relay arm 47, in contact 41, a disconnect switch 97, and an arm and in contact of a relay 19. Switch 97 is of the normally closed—momentarily opened type having contacts 100, 101 normally bridged by movable bridging member 98 provided with biasing means 102 connected to member 98 and a fixed part of the switch. Switch 97 includes a manually engaged portion 103 on part 98 which when depressed separates the bridge member 98 from its contacts 100, 101 with the biasing means 102 effecting renewing of the engagement upon release of the portion 103. Relay 19 is of the single pole-single make type having an operating winding 104, an arm 105 and an in contact 106.

The energization of winding 104 of the relay 19 is controlled by parallel switches 20, 21. Switch 20 comprises two contact carrying arms 108, 109 which are relatively movable. Arm 108 is fixed at one end and carries on its free end one switch contact. Arm 109 is pivoted at one end and intermediate its ends carries a second switch contact which coacts with the contact of arm 108. On its free end arm 109 carries a cam follower 111. Intermediate its ends, the arm 109 has biasing means 110. Follower 111 bears on the periphery of a cam 112. Cam 112 has high and low peripheral portions and the arrangement is such that when the follower 111 engages the low portion of the cam the biasing means 110 separates the contacts of the switch 20. The arms 108, 109 may be conventionally made of flexible material. Cam 112 is carried by the output shaft 12 of servomotor 14.

Switch 21 comprises two switch arms 113, 114 which carry opposed contacts. The switch includes a cam follower 115 secured to arm 114 and biasing means 116 also secured between arm 114 and a portion of the fixed part of switch 21. Follower 115 coacts with a cam 117 having high and low peripheral portions. When the follower 115 engages the low peripheral portion of cam 117 the biasing means 116 effects disengagement of the opposed contacts of switch arms 113, 114. The cam 117 may be designed so that follower 115 engages the low portion of cam 117 upon the craft exceeding a 20 degree bank in either direction. Therefore, the follower 115 is normally at the midpoint of the high peripheral portion of the cam. The high portion of cam 112 may be designed so that with the craft banked approximately 20 degrees and the aileron control surfaces not returned to their unoperated position, the follower 111 engages the low portion of cam 112. Thus if the craft is banked at 20 degrees and switch 21 is opened but the ailerons are returned to unoperated position, the switch 20 will be closed and no disengagement of the motor and control surface is effected.

Limited rotation of the servomotor 14 while maintaining the servomotor and ailerons engaged is controlled by conventional servo operated limit switches 36, 49. The operation of switches 36 or 49, for limiting the servomotor rotation while maintaining its engagement with the control surface is such, that either switch is not opened by means moved with cable drum 11 until the operated control surface approaches the fixed part of the craft and is thus provided to prevent abutting of the control surface with the craft fixed part. Either switch 36 or 49 is operated after switch 20 has been operated.

In operation, the craft is brought to the desired altitude and attitude with the control surfaces assumed in normal unoperated position at the desired attitude, about the longitudinal axis. Generally this is in a level attitude so that the various sliders in the signal generators of network 23 are in their normal position at the electrical centers of their resistors. The slider 74 of the directional gyroscope while not directly affected by roll attitude is also at the center of resistor 75. Switch 18 may be operated thereafter by moving switch arm 94 into engagement contact 95 momentarily. A circuit is thereby completed from source 123, conductor 124, switch contact 95, switch arm 94, conductor 140, conductor 125, operating winding 48, conductor 126, and return to battery 123.

With relay winding 48 momentarily energized, the relay arms 44, 45, 46 and 47 move to their operated positions, and a holding circuit for maintaining winding 48 is closed, the circuit extending from source 123, conductor 127, relay contact 106, relay arm 105, conductor 128, manual operable disconnect switch contact 101, bridge member 98, contact 100, conductor 129, relay arm 47, in contact 41, conductor 130, conductor 140, conductor 125, winding 48, conductor 126, to battery return.

Engagement of relay arm 105 with in contact 106 depends upon the continued energization of winding 104 of relay 19. This energization is provided by a circuit extending from source 123, conductor 127, conductor 131, relay winding 104, conductor 132, through parallel circuits comprising on the one hand conductor 133, switch arm 108, switch arm 109, conductor 134, conductor 135, and return to battery 123 and on the other hand conductor 136, switch arm 114, switch arm 113, conductor 137, conductor 135, to battery return.

If the craft changes heading, while its heading is being stabilized by the heading responsive gyroscope 82, slider 74 is displaced along resistor 75 to change the potential between slider 74 and slider 77 to unbalance network 23. Amplifier 17 operates one or the other of its relays to energize through relay contacts 38 and 39 one or the other of motor windings 27, 28. The energization of either of the motor windings 27 or 28 also energizes winding 29 which releases the brake effect on shaft 31 and permits its rotation by armature 30.

Reverting to the operation of engage relay 16. Engagement of switch arm 46 with its in contact 40 completes a circuit extending from battery 123, conductor 127, relay contact 106, relay arm 105, conductor 128, switch 97, conductor 129, arm 47, contact 41, conductor 130, conductor 140, conductor 59, relay arm 46, in contact 40, conductor 42, magnetic clutch 15, conductor 141, conductor 135 to battery return. Thus energization of the servomotor 14 is transmitted through the energized magnetic clutch 15 to the aileron control surfaces. The servomotor through its follow-up arrangement 71 positions slider 63 along resistor 62 to develop a potential between slider 63 and the center tap of secondary winding 69. A proportion of this voltage is selected by potential divider 64, and slider 63 is positioned until this proportion balances network 23. During the time that slider 63 is being positioned by operation of servomotor 14 the ailerons are also rotated. This rotation of the ailerons causes the craft to bank. As the aircraft banks, the vertical gyroscope 83 in response to the change in attitude of the craft during the bank operates slider 77 along resistor 78 to unbalance network 23 in the opposite direction from that resulting from the original displacement of slider 74 from the directional gyroscope 82.

Thus the voltage signals from the operation of vertical gyroscope slider 77 and follow-up slider 63 of servomotor 14 are of the same phase and oppose the signal from the displacement of slider 74 by gyroscope 82. The craft will continue to change its attitude about the longitudinal axis as long as the ailerons are displaced from normal position. As the craft continues therefore to increase its bank attitude, slider 77 is further adjusted and creates a greater unbalance from network 23. Eventually the sum of the voltages from the follow-up slider 66 and the vertical gyro slider 77 exceeds the signal due to displacement of the slider 74. This unbalance of network 23 results in the rotation of the servomotor 14 in the opposite direction to move the slider 63 toward its normal position and move the ailerons toward their unoperated positions. Eventually, the ailerons normally are returned to their unoperated position with the craft attaining a maximum bank angle. At this time, the signal from the potentiometer 76 whose slider 77 is positioned by vertical gyroscope 83 is equal and opposite to that from potentiometer 73 whose slider 74 is positioned by the directional gyroscope 82. With the ailerons returned to normal position, switch 20 is in the closed position and with the bank attitude below 20° switch 21 is also closed.

During the initial operation of the ailerons of the aircraft, the rate of roll of the aircraft may be very low so that in attempting to balance network 23 the servomotor 14 may have rotated to such an extent that switch 20 has been opened. However, due to the fact that the craft has a very slow rate of roll, the bank attitude of the craft has not reached the predetermined limit so that switch 21 is still closed, thereby maintaining the engaged relationship between servomotor 14 and the aileron control surfaces. As the craft does change attitude about the roll axis such change in attitude is reflected in the adjustment of slider 77 to unbalance network 23 in the opposite direction. Servomotor 14 will therefore be reversibly operated to return switch operating cam 112 and the ailerons to their normal position. Thus, even in an aircraft having a slower response in bank to changes in heading, the servomotor 14 will have returned the ailerons toward their normal position a sufficient distance so that when the craft has reached a predetermined bank angle attitude, the switch 20 will have returned to closed position by reverse operation of servomotor 14 so that the engaged condition of servomotor 14 and the aileron control surfaces is retained.

While the aircraft may change its attitude very slowly about the roll axis due to changes in heading and thus may not provide immediately any significant signal from potentiometer 76 which opposes the heading change signal of potentiometer 73 and thus cause the servomotor 14 to rotate until the follow-up potentiometer 61 supplies the rebalance signal, yet the operation of the control surface by motor 14 in accordance with the movement of the rebalance potentiometer 61, in order to balance network 23, in accordance with the heading change signal is limited by either limit switch 36 or 49 which prevent damage to the structure of the aircraft from the operated aileron.

If manual selected changes in heading through the steering mechanism are desired, the control knob 89 of signal generator 26 is operated in a direction depending upon the direction in which the turn is to be made. The operation of the knob 89 positions slider 86 along resistor 87. Also through the operating means 93 operation of knob 89 renders the gyroscope 82 ineffective to operate slider 74. The signal from the manual turn control signal generator 26 unbalances the network 23 subsequently resulting in the operation of the servomotor and ailerons. Again, the aileron servomotor through the follow-up connection 71 operates slider 63 to rebalance the network 23.

Where the craft is of the type slowly responsive to the displaced ailerons, the servomotor will have tried to move slider 63 until the turn control signal from generator 26 is balanced. This movement would cause the cam 112 to be rotated a distance sufficiently to open switch 20. With the craft slowly responsive to aileron, the switch 21 will be maintained in a closed condition therefore maintaining the engagement of the aileron servomotor with the aileron control surfaces.

As the aircraft responds to the operated ailerons, the vertical gyroscope 83 moves to slider 77 to generate a signal opposing that from the turn control signal generator 26. The network 23 thereby becomes unbalanced in the opposite direction and the aileron servomotor 14 reversely positions cam 112, the ailerons, and slider 63. As during heading stabilization, before the aircraft can reach an attitude of bank which would cause the vertical gyroscope 83, through cam 117, to open switch 21, the aileron servomotor 14 will have returned the ailerons to closed position a sufficient distance as to effect closing of switch 20 and maintain the aileron servomotor and the aileron control surfaces engaged.

Thus ordinarily, as a bank signal is applied, the bank gyro 83 follows the operation of the aileron servomotor, when the craft responds quickly to displacement of its ailerons, and the unbalance signal from either the stabilizing potentiometers 73 operated by directional gyroscope 82 or the manual turn control signal from generator 26 is offset by the sum of the signals from the servo balance potentiometer 61 and the vertical gyroscope potentiometer 77. This sum of the signals due to the follow-up potentiometer and the vertical gyroscope potentiometer consists of varying portions of signals from both potentiometers that is to say, servo balance potentiometer 61 has initially a maximum value which reduces to zero whereas the vertical gyroscope potentiometer 76 provides a signal which varies from zero to a maximum which maximum is equal to the heading change or manual control signal.

Where the aircraft is slowly responsive to any displacement of its ailerons, the heading change signal from potentiometer 73 or the manual turn control signal generator 26 is balanced by the follow-up potentiometer 61. During this rebalancing the aileron servomotor has opened switch 20 but switch 21 remains in closed position. As the slow responsive aircraft changes its attitude about its longitudinal axis, the aileron servomotor reversely rotates so that switch 20 will have been reclosed before switch 21 will have been opened due to changed attitude of the craft.

Should the aileron servomotor 14 have a malfunction and prevent a rebalancing signal from potentiometer 61, the unbalance of network 23 by operation of slider 74 from gyroscope 82 or the operation of slider 86 from manual turn control knob 89 is opposed by the positioning of slider 77 of potentiometer 76. Thus even with an aircraft whose rate of response to ailerons has no appreciable lag, the aileron servomotor will nevertheless operate to open switch 20 as it positions the ailerons. The ailerons in turn will cause the craft to change attitude about its roll axis so that switch 21 also will have been opened before slider 77 can move a distance sufficiently great to cause reverse unbalance of network 23 and return of the ailerons toward their unoperated position. Thus switches 20 and 21 are opened simultaneously also during this malfunction and the energization of winding 104 of relay 19 is interrupted. At this time, arm 105 of relay 19 moves to unoperated position to open the holding circuit for winding 48 and thus cause the relay arms 44, 45, 46 and 47 to move to unoperated position. This deenergization of relay winding 48 results in opening the circuit for the magnetic clutch 15 to disengage the aileron motor 14 from the aileron control surfaces.

The system also further provides for disengagement of the aileron servomotor 14 from the aileron control surfaces in event that there is a malfunction of the vertical gyro potentiometer 76. If the potentiometer does not provide a signal in network 23, any signal for initiating heading correction or changes in heading will be rebalanced by the signal from the follow-up potentiometer 61. However this leaves the aileron control surfaces displaced and will have caused the switch 20 to be opened. With the ailerons displaced the craft changes attitude about its roll axis and this change in attitude causes the opening of switch 21. As before the simultaneous opening of switches 20, and 21 results in a disengagement of the aileron servomotor 14 from the aileron control surfaces.

It will now be apparent that there has been provided a novel monitoring arrangement which responds to the operation of a motor that positions the control surface of an aircraft and which also responds to the change in attitude of the aircraft about an axis controlled by said surfaces and which monitoring arrangement serves to disconnect the servomotor from its control surfaces upon the servomotor and craft attitude simultaneously exceeding a predetermined and selected value.

Since other embodiments of the invention may now suggest themselves, it is desired that the invention be not restricted to the precise arrangement disclosed but as embodied in the claims affixed hereto.

What is claimed is:

1. Apparatus for controlling the heading of an aircraft having aileron control surfaces, said apparatus comprising: a servomotor adapted to be operatively engaged with said ailerons; means for operatively connecting said servomotor and ailerons; control means for said servomotor including a balanceable electrical network; means responsive to change in heading for unbalancing said network to effect operation of said ailerons to cause the craft to bank and change heading; follow-up means positioned by said servomotor to limit the operation thereof in proportion to said heading change; means responsive to the magnitude of the bank attitude of the craft for reversely unbalancing said network to cause said surfaces to be moved toward their normal position; and means for rendering said servomotor-aileron connecting means ineffective thereby to disable the servomotor from operating the aileron surfaces and jointly responsive to a simultaneous predetermined movement of said servomotor and to a predetermined bank attitude of said craft.

2. Apparatus for controlling the attitude of an aircraft in flight said aircraft having control surfaces for varying said attitude comprising: a servomotor for operating said surfaces; means including a relay and clutch controlled thereby adapted to connect or disconnect said servomotor from said surfaces; means responsive to change in attitude of the craft; control means for operating said servomotor and adjusted by said attitude means and follow-up means operated by said servomotor; and means responsive to movement simultaneously of said servomotor beyond a predetermined amount and to the movement of said attitude means beyond a predetermined amount for deenergizing said relay and rendering said clutch ineffective whereby said servomotor is disconnected from said surface.

3. Apparatus for controlling the bank attitude of an aircraft having aileron control surfaces, said apparatus comprising: a servomotor; releasable means for connecting said servomotor to said ailerons; balanceable control means for operating said servomotor said control means including an initiating controller and a follow-up controller driven by said servomotor; a switch operated upon movement of said servomotor beyond a predetermined amount; a second switch operated solely upon movement of the craft about its longitudinal axis beyond a predetermined amount; and means responsive to simultaneous operation of said two switches for releasing said connecting means.

4. Apparatus for operating a control surface of an aircraft, said apparatus comprising: a servomotor; electrically operated means adapted to connect said servomotor to said control surface; selectively operable means including a relay effective in one condition for controlling the connecting means; holding means to maintain said relay in said condition including two parallel circuits a pair of switches one in each circuit effective upon simultaneous operation for rendering the holding means ineffective for controlling said relay; means responsive to operation of said servomotor beyond a predetermined amount for operating one switch; and means effective solely when the attitude of the craft about an axis due to operation of said control surface exceeds a predetermined amount for operating the second switch.

5. Apparatus for controlling the flight of an aircraft having aileron control surfaces effective to control craft heading, said apparatus comprising: a servomotor, means for operatively connecting said servomotor and said aileron control surfaces; a control means having a balanceable network for reversibly operating said servomotor; means for changing heading of said craft from its present heading for unbalancing said network; means responsive to bank of said aircraft for opposing said heading change signals; relay means for effecting control of said servomotor by said control means; switch means responsive to operation of said servomotor beyond a predetermined limit to prevent further movement of the servomotor in the same direction but permitting reverse operation thereof; and further switch means responsive to both the simultaneous operation of the servo motor beyond a predetermined limit and the change in attitude of the craft about its roll axis beyond a predetermined limit controlled by said surfaces for disengaging said servomotor from said control surface.

6. Apparatus for operating a condition controlling device, said apparatus comprising: a servomotor operating said device; a balanceable network; control means responsive to said network and energizing said servomotor; a first means responsive proportionally to a change in said condition for unbalancing said network; a second means responsive proportionally to displacement of said servomotor from a normal position for rebalancing said network; and further means responsive to a predetermined change in said condition and to a predetermined displacement of said servomotor from normal position both occurring simultaneously for rendering said servomotor ineffective to further operate said device; and additional means in said further means maintaining said servomotor ineffective to further operate said device despite subsequent decrease in magnitude of change in said condition.

7. Apparatus for operating a condition controlling device, said apparatus comprising: a servomotor operating said device; a balanceable network; control means responsive to said network and energizing said servomotor; a first means responsive linearly to a change in said condition unbalancing said network; a second means responsive linearly to displacement of said servomotor from a normal position for rebalancing said network; means connecting said control means and said servomotor; and further means controlling continued effectiveness of said connecting means and responsive to a predetermined magnitude of change in the condition and a predetermined displacement of the servomotor, both occurring simultaneously, for rendering said connecting means ineffective and maintaining it ineffective despite a subsequent decrease in change in said condition for servomotor displacement.

8. Apparatus for controlling the heading of an aircraft having lateral tilt control means, said apparatus comprising: a servomotor adapted to operate said tilt control means; a balanceable network; control means responsive to said network and energizing said servomotor; a first means linearly responsive to a change in lateral attitude unbalancing said network; a second means linearly responsive to displacement of said servomotor from a normal position for rebalancing said network; and further means controlled by a predetermined response of said tilt responsive means and a predetermined displacement of said servomotor both occurring simultaneously for initially rendering and thereafter maintaining said servomotor ineffective to further operate said lateral tilt controlling means despite subsequent decrease in magnitude of the change in lateral attitude.

9. Apparatus for controlling the position of an aircraft having attitude control devices, said apparatus comprising: a servomotor including a clutch for operating said attitude control devices; automatic control means for said servomotor; means for releasing said clutch and thereby operatively disconnecting said servomotor from said attitude control devices; and means including two parallel electrical circuits, one circuit having a circuit controller responsive to movement of the servomotor beyond a predetermined amount and the other circuit having a circuit controller responsive to the attitude of the craft resulting from the operation of said attitude control devices beyond a predetermined amount said circuits being effective on simultaneous response of the two controllers for operating said clutch releasing means.

10. Apparatus for controlling the flight of an aircraft having attitude control devices, said apparatus comprising: a servomotor; means for operatively connecting said servomotor to said attitude control devices; a balanceable control means for operating said servomotor; means for unbalancing said control means to initiate operation of said servomotor from a normal position; follow-up means in said control means operated by said servomotor for adjusting said balanceable control means in accordance with the operation of said servomotor; circuit means for rendering said connecting means ineffective; and switch means responsive jointly to the simultaneous displacement of said servomotor from said normal position beyond a predetermined amount and displacement of said craft about an axis beyond a predetermined amount due to operation of said attitude control devices for initiating operation of said circuit means whereby said attitude control devices are disconnected from said servomotor.

References Cited in the file of this patent

UNITED STATES PATENTS

| | | |
|---|---|---|
| 1,918,082 | Carlson | July 11, 1933 |
| 2,480,574 | Hanna et al. | Aug. 30, 1949 |
| 2,487,793 | Esval et al. | Nov. 15, 1949 |
| 2,492,745 | Hammes | Dec. 27, 1949 |
| 2,595,250 | Harcum | May 6, 1952 |
| 2,634,391 | Russler | Apr. 7, 1953 |
| 2,674,711 | MacCallum | Apr. 6, 1954 |

FOREIGN PATENTS

| | | |
|---|---|---|
| 590,641 | Great Britain | July 24, 1947 |

OTHER REFERENCES

"Smiths Controlled Flight System," Smiths Aircraft Insts. Ltd., Cricklewood, London, England, September 1948.